(12) United States Patent
Huang

(10) Patent No.: US 8,454,386 B1
(45) Date of Patent: Jun. 4, 2013

(54) ELETRONIC DEVICE HAVING A TRAY FOR PLACING DIGITAL CARD

(75) Inventor: Mao-Hsiang Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/340,652

(22) Filed: Dec. 29, 2011

(30) Foreign Application Priority Data

Nov. 29, 2011 (TW) .............................. 100143655 A

(51) Int. Cl.
*H01R 13/648* (2006.01)

(52) U.S. Cl.
USPC .................................................... 439/607.22

(58) Field of Classification Search
USPC ................ 439/607.22, 630, 159–160, 638, 439/541.5, 218, 945, 326, 327
See application file for complete search history.

(56) References Cited

U.S. PATENT DOCUMENTS

| | | | | |
|---|---|---|---|---|
| 6,390,855 B1 * | 5/2002 | Chang | ............................ | 439/638 |
| 6,954,653 B2 * | 10/2005 | Morita | ........................ | 455/550.1 |
| 7,052,325 B2 * | 5/2006 | Lin et al. | ........................ | 439/630 |
| 2008/0207060 A1 * | 8/2008 | Kiryu et al. | .................... | 439/660 |

* cited by examiner

*Primary Examiner* — Edwin A. Leon
(74) *Attorney, Agent, or Firm* — Altis Law Group, Inc.

(57) ABSTRACT

A tray includes a first slot and a second slot. The first slot is for placing a first digital card including contacts. The second slot is for placing a second digital card including contacts. The second slot is defined in the bottom of the first slot and is smaller than the first slot. An opening is defined on the bottom of the second slot. When the first digital card or the second digital card is placed into the tray, the contacts of the first digital card or the second digital card are exposed through the opening. When the tray is received in a connector of an electronic device, the exposed contacts of the first digital card or the second digital card are electrically connected to the connector of the electronic device.

5 Claims, 6 Drawing Sheets

ELETRONIC DEVICE HAVING A TRAY FOR PLACING DIGITAL CARD

BACKGROUND

1. Technical Field

The present disclosure relates to an electronic device having a tray for placing two digital cards with different sizes.

2. Description of Related Art

There are two types of subscriber identity module (SIM) cards that are commonly used. One type is a conventional SIM card with a larger size. The other type is a micro SIM card with a smaller size. Most of electronic devices only provide one card slot for fixing one of the two types of SIM cards, thus rendering the devices less flexible.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
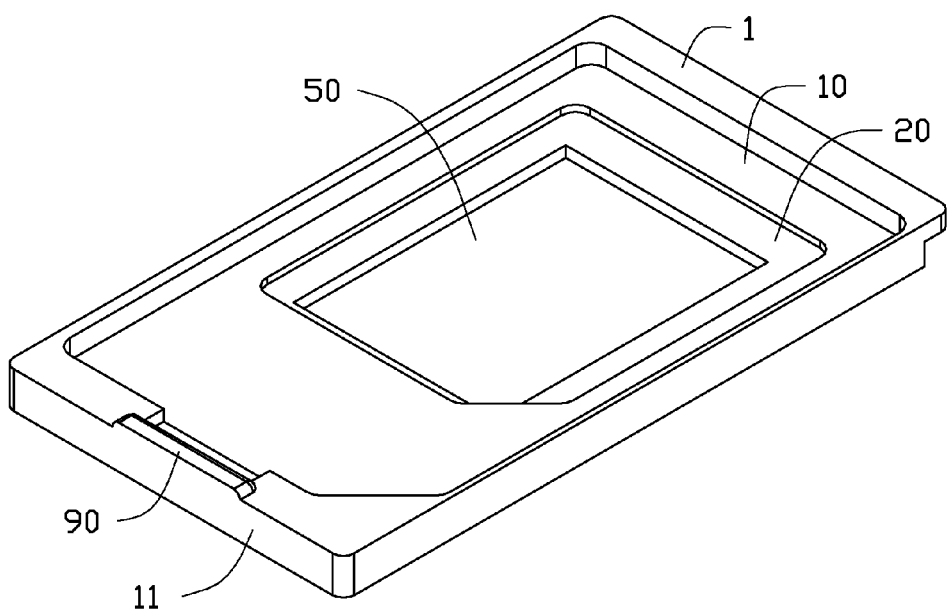
FIG. 1 is an isometric view of a tray in accordance with an exemplary embodiment.
Figure 2:
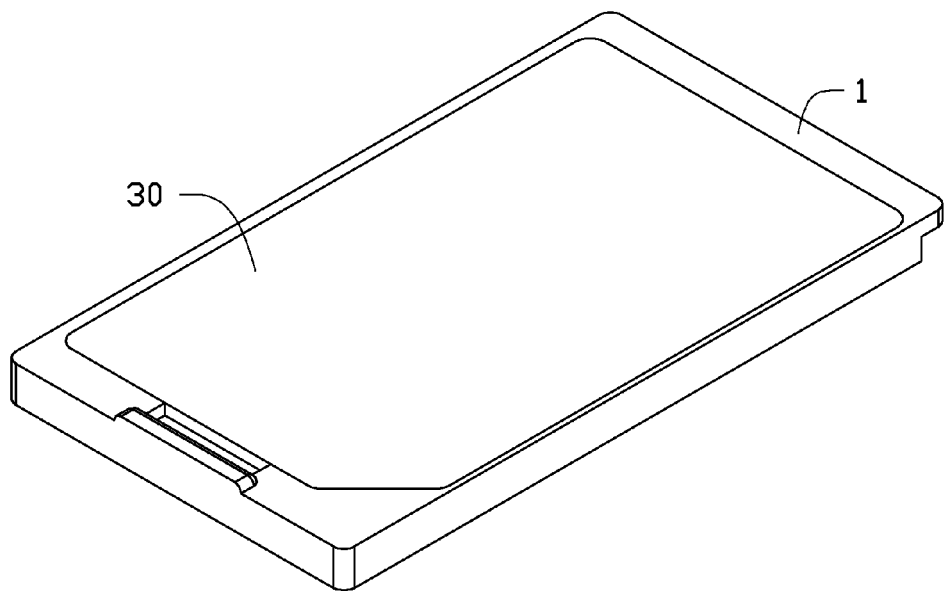
FIG. 2 is an isometric view of a first digital card being placed into the tray of FIG. 1.
Figure 3:
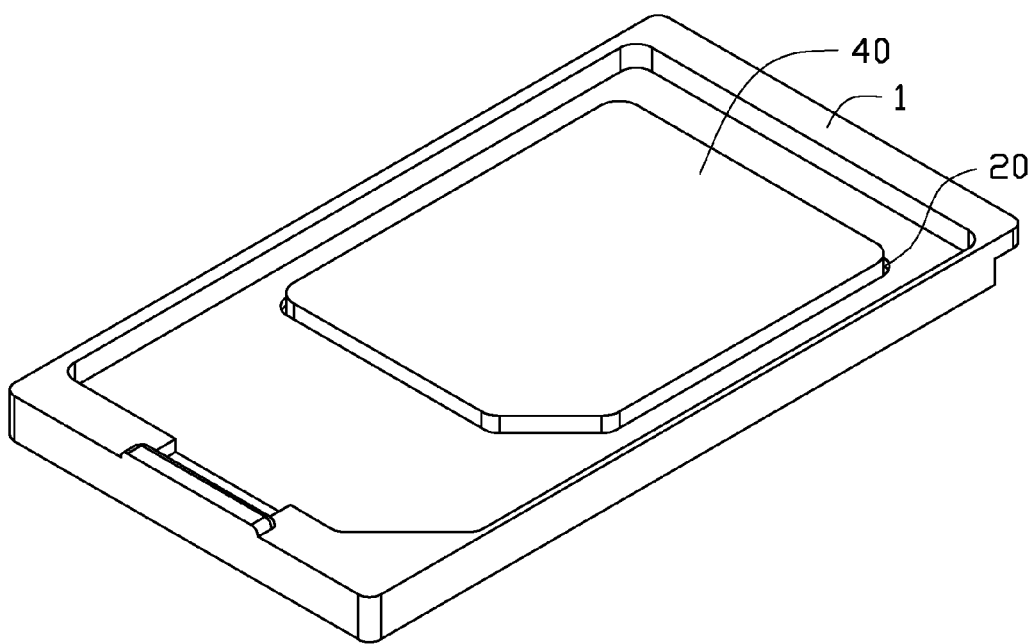
FIG. 3 is an isometric view of a second digital card being placed into the tray of FIG. 1.
Figure 4:
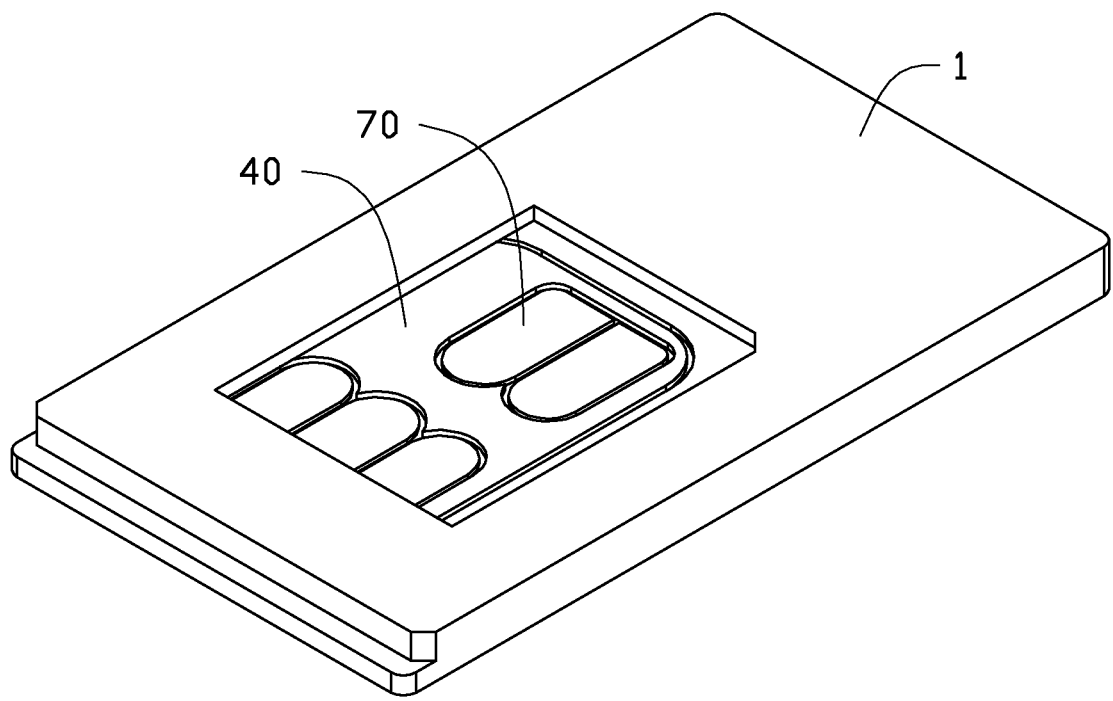
FIG. 4 is a view similar to FIG. 2 and FIG. 3, but viewed from a different perspective.

FIGS. 1-4, show a tray 1 including a first slot 10 and a second slot 20. The second slot 20 which is smaller than the first slot 10 is defined in the bottom of the first slot 10. The first slot 10 is for placing a first digital card 30, as shown in FIG. 2. The second slot 20 is for placing a second digital card 40, as shown in FIG. 3. A opening 50 is defined in the bottom of the second slot 20. As shown in FIG. 4, when the first digital card 30 or the second digital card 40 is placed into the tray 1, the contacts 70 of the first digital card 30 or the second digital card 40 are exposed through the opening 50.

Figure 5:
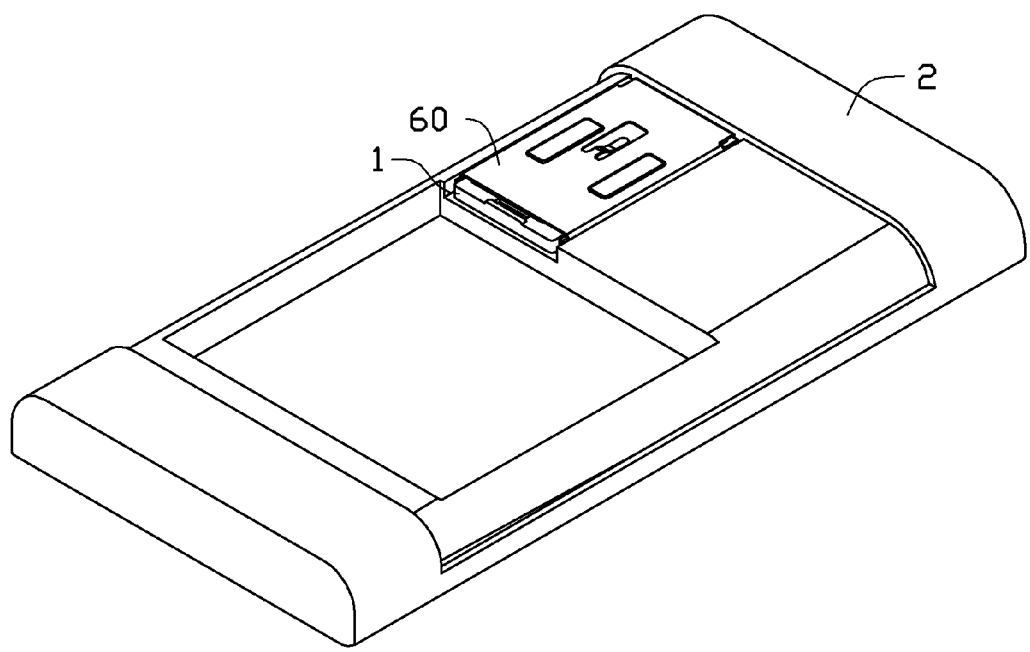
FIG. 5 is an isometric view of the tray of FIG. 1 being received in a connector of an electronic device.
Figure 6:
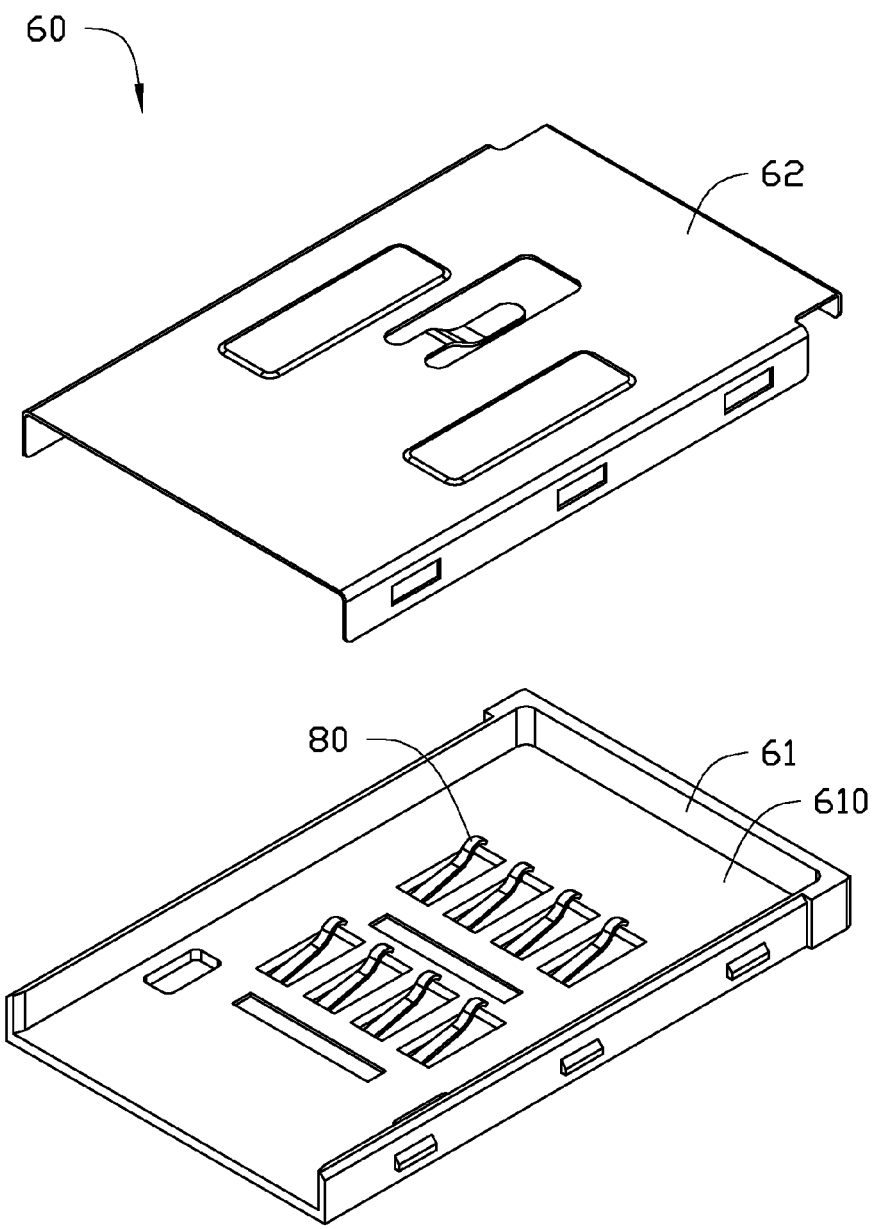
FIG. 6 is an explored view of the connector of FIG. 5.

Referring to FIGS. 5-6, an electronic device 2 includes a connector 60 for receiving the tray 1. The connector 60 includes a base 61 defining a receiving space 610, a cover 62 detachably disposed on the base 61, and a number of metal elastic elements 80 formed on a bottom of the receiving space 610. When the tray 1 is received into the connector 60, the metal elastic elements 80 extend through the opening 50 and contact the contacts 70 of the first digital card 30 or the second digital card 40 electrically connect the first digital card 30 or the second digital card 40 to the connector 60 and the electronic device 2.

In this embodiment, as shown in FIG. 1, for conveniently drawing the tray 1 from the connector 60, the tray 1 further includes a protrusion 90 extending from a wall 11 of the tray 1, which is exposed when the tray 1 is received in the connector 60.

In this embodiment, the shape of the first slot 10 matches that of the first digital card 30, and the shape of the second slot 20 matches that of the second digital card 40.

In this embodiment, the first digital card is a subscriber identity module (SIM) card 40, the second digital card is a Micro SIM card.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. An electronic device comprising:
   a tray defining a first slot to accommodate a first digital card, a second slot in a bottom of the first slot to accommodate a second digital card, and an opening in a bottom of the second slot to expose the contacts of the first digital card and the second digital card, wherein the second slot is smaller than the first slot; and
   a connector defining a receiving space for receiving the tray and comprising a plurality of metal elastic elements extending through the opening;
   wherein when the tray accommodating the first digital card is received in the connector, the plurality of metal elastic elements contact the contacts of the first digital card, and when the tray accommodating the second digital card is received in the connector, the plurality of metal elastic elements contact the contacts of the second digital.

2. The electronic device as described in claim 1, further comprising a protrusion extending from a wall of the tray, wherein the protrusion is exposed when the tray is received in the connector.

3. The electronic device as described in claim 1, wherein a shape of the first slot matches that of the first digital card and a shape of the second slot matches that of the second digital card.

4. The electronic device as described in claim 1, wherein the first digital card is a subscriber identity module (SIM) card and the second digital card is a Micro SIM card.

5. The electronic device as described in claim 1, wherein the connector comprises a base defining the receiving space and a cover detachably disposed on the base, and the plurality of metal elastic elements are formed on a bottom of the receiving space.

* * * * *